US012663285B2

(12) United States Patent
Nagata et al.

(10) Patent No.: US 12,663,285 B2
(45) Date of Patent: Jun. 23, 2026

(54) INFORMATION PROCESSING DEVICE

(71) Applicant: TOYOTA JIDOSHA KABUSHIKI KAISHA, Toyota (JP)

(72) Inventors: Yu Nagata, Chofu (JP); Takehira Ota, Inazawa (JP); Daisuke Tanizaki, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/808,421

(22) Filed: Aug. 19, 2024

(65) Prior Publication Data

US 2025/0189337 A1      Jun. 12, 2025

(30) Foreign Application Priority Data

Dec. 6, 2023      (JP) ................................. 2023-206353

(51) Int. Cl.
*G01C 21/36*            (2006.01)
(52) U.S. Cl.
CPC ..... *G01C 21/3682* (2013.01); *G01C 21/3655* (2013.01)
(58) Field of Classification Search
CPC ........................ G01C 21/3682; G01C 21/3655
See application file for complete search history.

(56) References Cited

U.S. PATENT DOCUMENTS

| | | | | |
|---|---|---|---|---|
| 8,630,800 | B1 * | 1/2014 | Connolly ............. | G01C 21/343 |
| | | | | 340/995.14 |
| 2002/0047787 | A1 * | 4/2002 | Mikkola ................ | H04W 4/02 |
| | | | | 340/995.1 |
| 2006/0253247 | A1 * | 11/2006 | de Silva ............. | G01C 21/3679 |
| | | | | 701/426 |
| 2008/0033640 | A1 * | 2/2008 | Amano .............. | G01C 21/3476 |
| | | | | 701/414 |
| 2013/0073325 | A1 * | 3/2013 | Ross ....................... | G06Q 10/02 |
| | | | | 705/6 |
| 2019/0086223 | A1 * | 3/2019 | Tanaka .................... | G06F 16/00 |
| 2020/0278211 | A1 * | 9/2020 | Murakami ............ | H04W 4/024 |
| 2023/0325949 | A1 * | 10/2023 | Nagasaka .............. | G06Q 50/14 |
| | | | | 705/5 |

FOREIGN PATENT DOCUMENTS

| | | | | | |
|---|---|---|---|---|---|
| CN | 105632215 | A | * | 6/2016 | ............. B60K 35/29 |
| CN | 116415991 | A | * | 7/2023 | ......... G06Q 30/0239 |
| JP | 2008-051605 | A | | 3/2008 | |
| JP | 2011128799 | A | * | 6/2011 | |
| JP | 2015-075354 | A | | 4/2015 | |
| JP | 2023-162648 | A | | 11/2023 | |
| WO | 2019/244403 | A1 | | 12/2019 | |

* cited by examiner

*Primary Examiner* — Justin S Lee
(74) *Attorney, Agent, or Firm* — SoraIP, Inc.

(57) ABSTRACT

The control unit of the information processing device acquires first information related to one or more first facilities located in the vicinity of the scheduled traveling route of the vehicle. The control unit identifies, based on the first information, a second facility, which is a facility located in the traveling direction of the vehicle, among the first facilities. The control unit identifies, based on the first information, a third facility that is a facility including a vehicle facility among the second facilities. The control unit identifies, from among the third facilities, a fourth facility that does not correspond to a predetermined exclusion target. The control unit outputs second information regarding the fourth facility.

11 Claims, 4 Drawing Sheets

STORE INFORMATION

| STORE ID | ATTRIBUTE INFORMATION | EVENT INFORMATION | VEHICLE EQUIPMENT INFORMATION | POSITION INFORMATION | PHONE RESERVATION INFORMATION | PHONE NUMBER |
|---|---|---|---|---|---|---|
| ------- | HAMBURGER | LIMITED-TIME MENU ○○SALES | YES | ------- | YES | ------- |
| ------- | JAPANESE CUISINE | NO EVENT | NO | ------- | NOT POSSIBLE | ------- |
| ⋮ | ⋮ | ⋮ | ⋮ | ⋮ | ⋮ | ⋮ |

FIG. 2

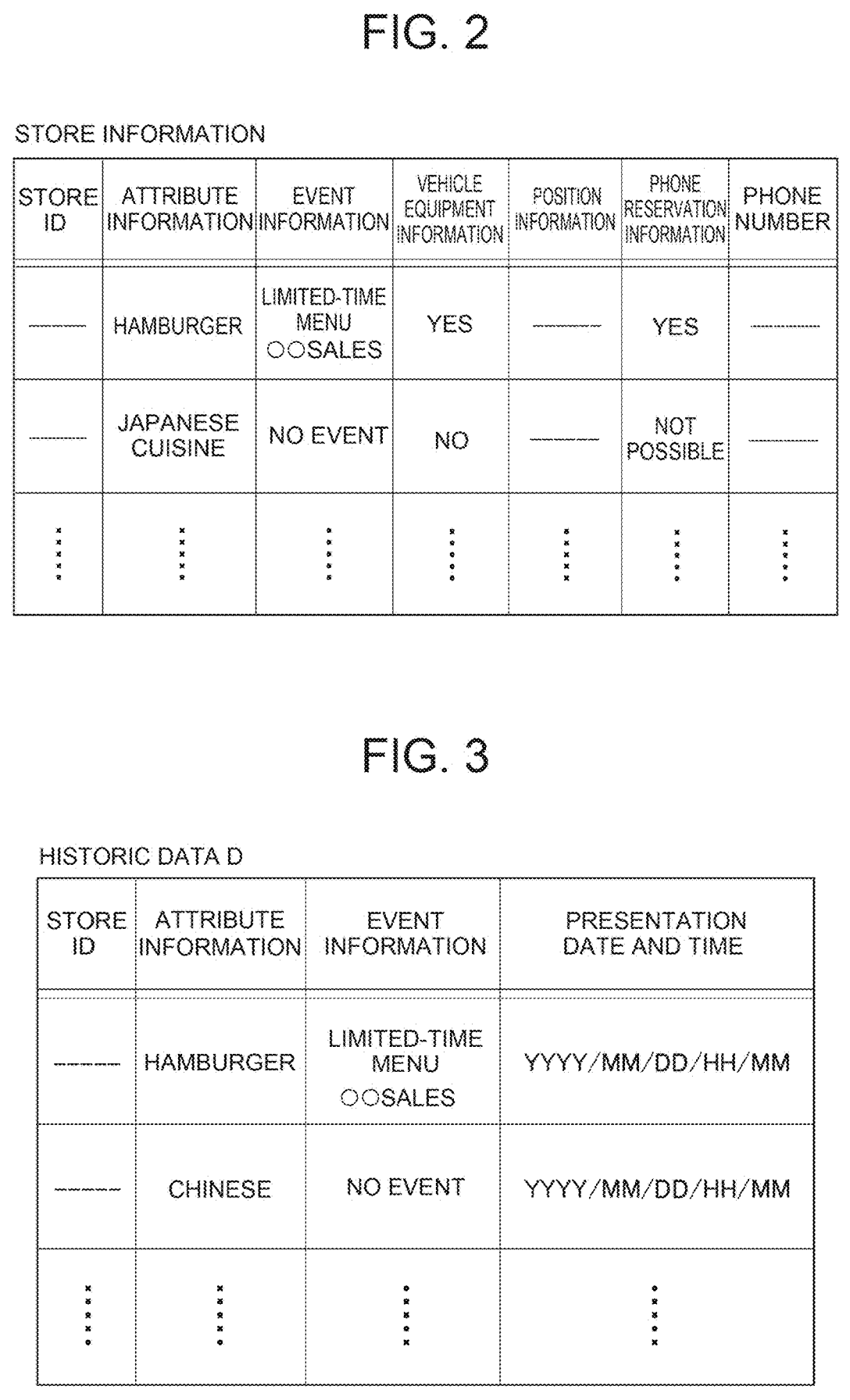

STORE INFORMATION

| STORE ID | ATTRIBUTE INFORMATION | EVENT INFORMATION | VEHICLE EQUIPMENT INFORMATION | POSITION INFORMATION | PHONE RESERVATION INFORMATION | PHONE NUMBER |
|---|---|---|---|---|---|---|
| ———— | HAMBURGER | LIMITED-TIME MENU ◯◯SALES | YES | ———— | YES | ———— |
| ———— | JAPANESE CUISINE | NO EVENT | NO | ———— | NOT POSSIBLE | ———— |
| ⋮ | ⋮ | ⋮ | ⋮ | ⋮ | ⋮ | ⋮ |

FIG. 3

HISTORIC DATA D

| STORE ID | ATTRIBUTE INFORMATION | EVENT INFORMATION | PRESENTATION DATE AND TIME |
|---|---|---|---|
| ———— | HAMBURGER | LIMITED-TIME MENU ◯◯SALES | YYYY/MM/DD/HH/MM |
| ———— | CHINESE | NO EVENT | YYYY/MM/DD/HH/MM |
| ⋮ | ⋮ | ⋮ | ⋮ |

INFORMATION PROCESSING DEVICE

CROSS-REFERENCE TO RELATED APPLICATION

This application claims priority to Japanese Patent Application No. 2023-206353 filed on Dec. 6, 2023, incorporated herein by reference in its entirety.

BACKGROUND

1. Technical Field

The present disclosure relates to information processing devices.

2. Description of Related Art

A technique is known in which the latest information about points around a route from a current position to a destination is displayed on a car navigation system mounted on a vehicle (for example, refer to Japanese Unexamined Patent Application Publication No. 2015-075354 (JP 2015-075354 A).

SUMMARY

An object of the present disclosure is to provide a technique capable of improving convenience of a user when presenting information of facilities located around a traveling route of a vehicle.

One aspect of the present disclosure provides an information processing device. For example, the information processing device may comprise a control unit configured to execute acquiring first information about one or more first facilities located around a scheduled travel route of a vehicle, specifying, according to the first information, second facilities that are facilities located in a traveling direction of the vehicle, from among the first facilities, specifying, according to information corresponding to the second facilities included in the first information, third facilities that are facilities provided with a vehicle facility, from among the second facilities, specifying, according to information corresponding to the third facilities included in the first information, fourth facilities that are facilities not corresponding to predetermined facilities to be excluded, from among the third facilities, and outputting second information about the fourth facilities.

The present disclosure can also be regarded as an information processing method in which a computer executes the processing of the information processing device, as an information processing program for causing a computer to execute the information processing method, or as a non-transitory storage medium storing the information processing program.

According to the present disclosure, it is possible to provide a technique capable of improving convenience of a user when presenting information of facilities located around a traveling route of a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram schematically illustrating an example of store information according to the embodiment;

FIG. 3 is a diagram schematically illustrating an example of history data in the embodiment;

DETAILED DESCRIPTION OF EMBODIMENTS

Figure 1:
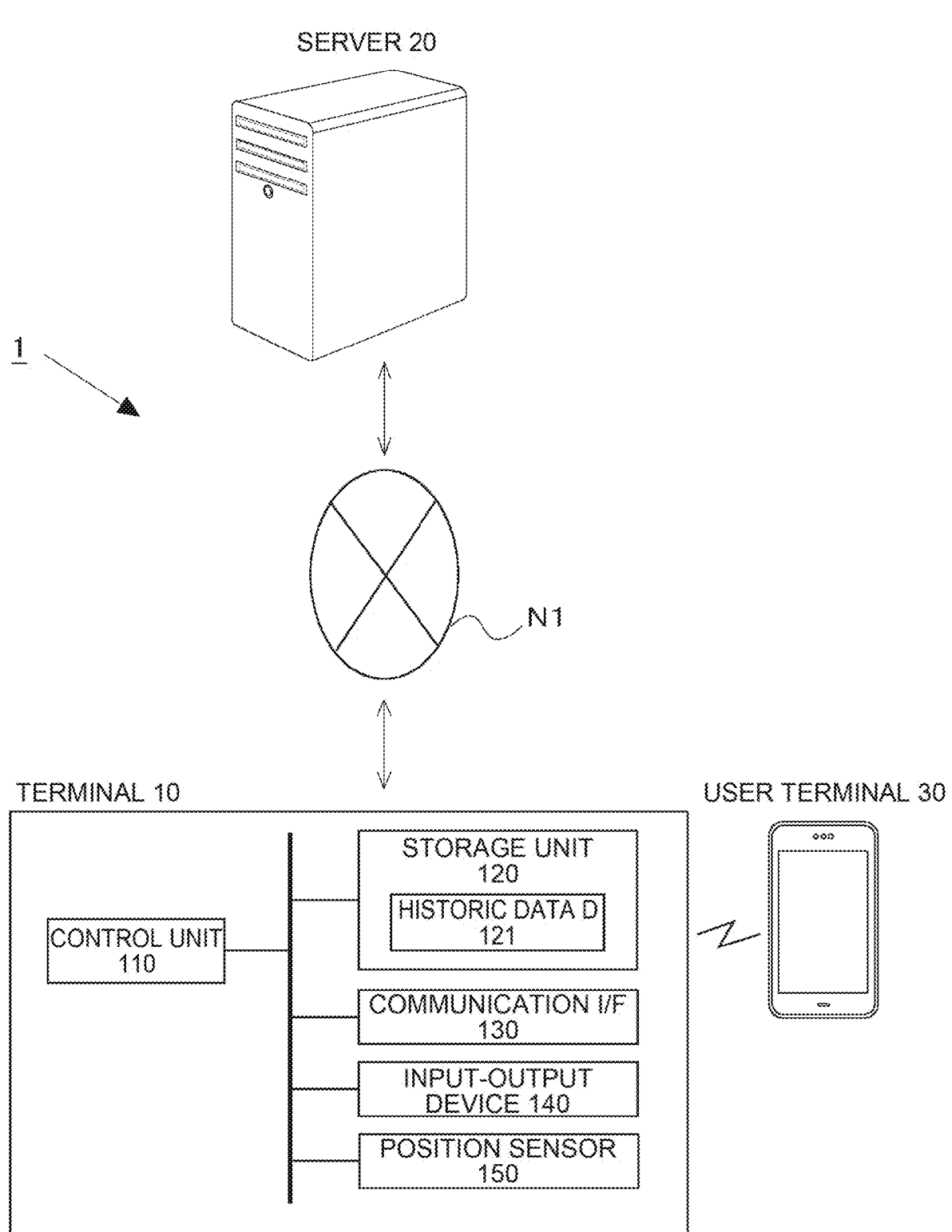
FIG. 1 is a diagram schematically illustrating an example of a configuration of a system according to an embodiment.

A technique is known in which, when a user moves in a vehicle, information on a facility such as a store located in the vicinity of a scheduled travel route of the vehicle is presented to the user through a portable terminal of the user, an in-vehicle terminal, or the like. Incidentally, when information on the same facility or information on a similar facility is frequently presented, the user of the vehicle may feel troublesome and the convenience of the user may be impaired. Therefore, there is a need for a technique for improving the convenience of a user when presenting a facility around a vehicle.

Therefore, the information processing device according to the present disclosure presents information to the user only for a facility that satisfies a predetermined condition among one or more facilities located in the vicinity of a scheduled traveling route of the vehicle. The information processing device according to the present disclosure may be a user terminal (for example, a smartphone, a tablet terminal, or the like) in which an application program for car navigation is installed, or may be a car navigation system mounted on a vehicle.

In the information processing device according to the present disclosure, the control unit acquires the first information regarding the one or more first facilities located in the vicinity of the scheduled traveling route of the vehicle. The scheduled traveling route may be a route set according to the destination in the car navigation system mounted on the vehicle, or may be a route predicted based on the traveling route up to the current point of time and the past route history. Further, the surroundings of the scheduled traveling route of the vehicle may include, in addition to the traveling scheduled route of the vehicle, the surroundings of the road located in the vicinity of the scheduled traveling route.

In an example, the first information may be obtained by providing the first information from the external server to the information processing device. In another example, the first information may be acquired by the information processing device generating the first information.

When the first information is acquired by the above-described method, the control unit identifies the second facility in accordance with the acquired first information. The second facility according to the present disclosure is a facility located in the traveling direction of the vehicle among the first facilities. The "facility located in the traveling direction of the vehicle" in the present disclosure may be, in an example, a facility located on the traveling direction side of the current position of the vehicle among the facilities located along the scheduled traveling route, and may be a facility located along the lane in the traveling direction of the vehicle. That is, the "facility located in the traveling direction of the vehicle" in the present disclosure may not include a facility located on the side of the vehicle in the reverse direction (the direction opposite to the traveling direction of the vehicle) from the current position of the vehicle. In addition, the "facility located in the traveling direction of the vehicle" in the present disclosure may not include a facility located along a lane (opposite lane) in a direction opposite to the traveling direction of the vehicle.

The control unit of the information processing device according to the present disclosure identifies the third facility in response to the identification of the second facility. The third facility according to the present disclosure is a facility including a vehicle facility among the second facilities. The vehicle facility according to the present disclosure is a facility installed in a site of a facility, and is a facility into which a vehicle can enter. Examples of such a vehicle facility include a parking lot and a drive-through. The identification of the third facility may be performed based on information corresponding to the second facility included in the first information.

The control unit of the information processing device according to the present disclosure identifies the fourth facility in response to the identification of the third facility. The fourth facility according to the present disclosure is a facility of the third facility that does not fall under a predetermined exclusion target. The predetermined exclusion target may include, in one example, a facility presented to the user in a predetermined period of time in the past (a facility targeted by the second information described later) and a facility similar to the facility, in which an event different from the predetermined period of time is not held. The predetermined period of time in the past may be one week or one month. A facility similar to a facility presented to a user in a predetermined period of time in the past may be a facility having the same type of service or product to be provided. In one example, multiple hamburger shops belonging to different chains may be treated as similar facilities. The event different from the predetermined period may include sales of a new product that has not been sold during the predetermined period, or sales of a limited product that has not been sold during the predetermined period. Events different from the predetermined period may include issuance of a coupon different from the predetermined period, a present plan not performed during the predetermined period, a campaign not held during the predetermined period, and the like.

The control unit of the information processing device according to the present disclosure outputs second information that is information about the fourth facility in response to the identification of the fourth facility. The second information may include a name of the fourth facility, a location of the fourth facility, a service provided at the fourth facility (or a product sold at the fourth facility), and the like. Further, outputting the second information may include presenting the second information to the user through an output device (for example, a display and/or a speaker) included in the information processing device.

According to the information processing device of the present disclosure, the information is presented to the user only for the facility corresponding to the second facility, the third facility, and the fourth facility among the facilities corresponding to the first facility. Therefore, it is possible to suppress the user from feeling troublesomeness. As a result, it is possible to improve the convenience of the user in presenting the information of the facility located in the vicinity of the traveling route of the vehicle.

In the information processing device according to the present disclosure, outputting the second information may include detecting that the vehicle is stopped by a red signal. Outputting the second information may include obtaining a remaining time length of the red signal. Further, outputting the second information may include outputting the second information on condition that the remaining time length is equal to or longer than the predetermined time length. Accordingly, in a case where the time length to stop by the red signal is equal to or longer than the predetermined time length, the second information can be presented to the user. As a result, it is possible to suppress the second information from being output at a timing at which information presentation to the user is undesirable.

In a mode in which the second information is output on condition that the remaining time length of the red signal is equal to or longer than the predetermined time length, the amount of information of the second information to be output may be changed in accordance with the remaining time length of the red signal. As an example, in a case where the remaining time length of the red signal is less than the threshold value (longer than the predetermined time length), the simplified information of the fourth facility may be output as the second information, and in a case where the remaining time length of the red signal is equal to or larger than the threshold value, the detailed information of the fourth facility may be output as the second information. This makes it possible for the user to recognize the information more reliably on the fourth facility.

Further, the control unit of the information processing device according to the present disclosure may be configured to further execute, after outputting the second information, an operation of making a telephone reservation of the fourth facility and a call to the fourth facility in response to the operation being accepted. This makes it easy for the user to make a reservation for the fourth facility in advance when the user stops at the fourth facility in the vehicle. Note that the reservation of the fourth facility may be a reservation of a seat or a reservation of a commodity.

Hereinafter, an embodiment of the present disclosure will be described with reference to the drawings. The hardware configuration, the module configuration, the functional configuration, and the like described in the following embodiments are not intended to limit the technical scope of the disclosure only thereto unless otherwise specified.

Embodiment

In the present embodiment, an example in which the information processing device according to the present disclosure is applied to a system for providing information on a facility to a user who drives a vehicle will be described.

FIG. 1 is a diagram schematically illustrating an example of a configuration of a system 1 according to the present embodiment. In the example illustrated in FIG. 1, the system 1 includes a terminal 10, a server 20, and a user terminal 30. In the example illustrated in FIG. 1, only one terminal 10 and one user terminal 30 are illustrated, but a plurality of terminals 10 and user terminals 30 may be included in the system 1. The terminals 10 and the servers 20 are connected to each other via a network N1. The network N1 may include, in one instance, a wide area network (WAN, which is a global public communication network such as the Internet), and/or a radio communication network such as Wi-Fi (registered trademark). In addition, the terminal 10 and the user terminal 30 are connected to each other via wireless communication of BLE standards or short-range wireless communication such as NFC. Further, the user terminal 30 is connected to a mobile phone communication network.

The terminal 10 is a computer mounted on a vehicle and has a function of a car navigation system. Note that the terminal 10 may be a portable terminal (for example, a smartphone or a tablet terminal) in which an application program for car navigation is installed.

The terminal 10 according to the present embodiment has a function of transmitting vehicle information including a traveling route of the vehicle to the server 20. The terminal 10 according to the present embodiment also has a function of selecting a store to be presented to the user on the basis of store information to be described later provided from the server 20, and a function of presenting information about the selected store to the user of the vehicle. Further, the terminal 10 according to the present embodiment also has a call origination function of making a call for reservation to a store presented to the user through the user terminal 30.

The server 20 is one or more computers for providing information about a facility to the terminal 10. The server 20 according to the present embodiment has a function of generating information on one or more facilities located in the vicinity of a scheduled traveling route of the vehicle in response to reception of the vehicle information transmitted from the terminal 10, and transmitting the generated information to the terminal 10. As used herein, the term "around the scheduled traveling route" includes not only along the scheduled traveling route but also along a road located around the scheduled traveling route. In the present embodiment, the server 20 provides the terminal 10 with information on at least one restaurant located in the vicinity of the scheduled travel route of the vehicle (hereinafter, may be referred to as "shop information"). At this time, the server 20 may store map data including the positions of the plurality of restaurants located in the area including the scheduled traveling route, and store data related to the attributes of the plurality of restaurants. The server 20 may identify a store located in the vicinity of the scheduled traveling route of the vehicle based on the scheduled traveling route of the vehicle and the map data. Further, the server 20 may generate the store information by extracting the information of the identified store from the store data. In the present embodiment, the store information corresponds to the "first information" according to the present disclosure.

Note that the facility to be the target of the information provided from the server 20 to the terminal 10 is not limited to a restaurant, and may be a shop other than food and drink, an amusement facility, a shopping mall, a home center, a hobby shop, a department store, or the like.

As illustrated in FIG. 2, the store information provided from the server 20 to the terminal 10 may include information such as an identifier of the store (store ID), attribute information, event information, vehicular facility information, location information, telephone reservation information, and telephone number. The store ID is information for identifying each store, and may be, for example, a name of the store. The attribute information is information indicating the attribute of each store, and may be, for example, information indicating the type of food and drink to be sold. Note that the attribute information of the store belonging to the chain store may include information for identifying the chain. The event information is information indicating the content of an event being held at each store. The event in the present embodiment may include sales of a new menu, sales of a limited menu, issuance of a coupon, a gift plan, a campaign, and the like. Note that the event information of the store in which the event is not held may be information indicating that the event is not held. The vehicle facility information may be information indicating whether or not each store is equipped with the vehicle facility. The vehicle facility according to the present embodiment is a facility installed in a site of a store, and is a facility into which a vehicle can enter. Such vehicle facility may, in one example, be a parking lot, a drive-through, and the like. The location information is information (e.g., geographic coordinates) indicating the position (location) of each store. The telephone reservation information is information indicating whether or not each shop can make a telephone reservation.

The user terminal 30 is a portable communication terminal used by a user of the vehicle. The user terminal 30 is, for example, a smartphone carried by a user of the vehicle or a mobile phone carried by a user of the vehicle. The user terminal 30 according to the present embodiment has a function of making a call with a store desired by the user in response to a request from the terminal 10.

Configuration of Terminal

Here, the configuration of the terminal 10 according to the present embodiment will be described with reference to FIG. 1. The terminal 10 in the present embodiment is a computer mounted in a vehicle. The terminal 10 is configured as a computer including a processor (such as a CPU or a GPU), a main storage device (such as a RAM and a ROM), and a secondary storage device (such as an EPROM, a hard disk drive, and a removable medium). In the present embodiment, the terminal 10 corresponds to an information processing device according to the present disclosure.

The terminal 10 according to the present embodiment may be configured only by a car navigation system mounted on a vehicle. Alternatively, the terminal 10 may be configured by combining a plurality of in-vehicle devices such as a data communication module (DCM), a head unit, and a car navigation system. As illustrated in FIG. 1, such a terminal 10 includes a control unit 110, a storage unit 120, a communication I/F 130, an input/output device 140, and a position sensor 150.

The control unit 110 realizes various functions as described later by executing a dedicated program stored in the storage unit 120. For example, the control unit 110 includes a hardware processor such as a central processing unit (CPU) or a digital signal processor (DSP). In addition, the control unit 110 can be realized by. The control unit 110 may further include a RAM, ROM, a cache memory, and the like. Details of the functions realized by the control unit 110 will be described later.

The storage unit 120 includes an auxiliary storage device and stores various types of information. Note that the storage unit 120 may be a storage area constructed in the auxiliary storage device. The information stored in the storage unit 120 includes, in addition to OS, a dedicated program for presenting information about a store to a user, data used by the program, and the like. The data stored in the storage unit 120 in the present embodiment includes history data D121. The history data D121 is data related to a store presented to the user in the past.

FIG. 3 is a diagram schematically illustrating an exemplary history data D121 stored in the storage unit 120. In the embodiment illustrated in FIG. 3, the history data D121 includes the store ID, the attribution information, the event information, and the presentation date and time of the store presented to the user in the past. The store ID and the attribute information included in the history data are the same as the store ID and the attribute information included in the store information described with reference to FIG. 2.

The event information included in the history data D121 is information indicating a content of an event held in the store at a time point when the event information has been presented to the user in the past. The presentation date and time is information indicating the date and time when the information of the store is presented to the user in the past. Note that the storage unit 120 may store only the history data D121 presented in the previous predetermined period. The predetermined period of time may be, for example, one month. However, the predetermined period may be appropriately changed according to the embodiment.

The communication I/F 130 includes a communication interface for connecting the terminal 10 to the network N1, a radio communication interface for connecting the terminal 10 to the user terminal 30, and the like. In one instance, the communication I/F 130 may include a communication interface for mobile communication (e.g., 3G, LTE, 5G, 6G, etc.) and a wireless communication interface for near field communication. The communication I/F 130 of the present embodiment communicates with the servers 20 through a network N1. Further, the communication I/F 130 of the present embodiment communicates with the user terminal 30 using short-range radio communication, and performs mobile telephone communication with a store desired by the user through the user terminal 30.

The input/output device 140 receives an input operation from a user of the vehicle and presents information to the user. Specifically, the input/output device 104 includes, for example, a touch panel or a push button capable of inputting a symbol such as a character, and an input device such as a microphone capable of inputting voice. Further, the input/output device 140 includes an output device such as a display or a speaker. In one example, the input/output device 104 may be configured to include a touch panel display and a speaker capable of input/output. In the present embodiment, the input/output device 140 displays and/or outputs the information of the store selected by the control unit 110.

The position sensor 150 acquires position information (for example, latitude and longitude) of the vehicle. In one instance, the position sensor 150 may be configured to include a global positioning system (GPS) receiver. In another instance, the position sensor 150 may be configured to include radio communication circuitry that utilizes Wi-Fi location services.

Next, the control unit 110 of the terminal 10 will be described in detail. The control unit 110 of the terminal 10 transmits the vehicle information including the scheduled traveling route of the vehicle to the servers 20 through the communication I/F 130. In an example, the scheduled traveling route may be a scheduled traveling route that is set in response to an input of a destination in the car navigation system. In this case, the vehicle information may be transmitted to the server 20 triggered by the travel scheduled route being set.

When the vehicle is traveling without the destination being input to the car navigation system, the route predicted by the car navigation system in accordance with the current position of the vehicle and the past travel history may be used as the travel scheduled route. In this case, the vehicle information may be transmitted to the server 20 triggered by the fact that the scheduled traveling route is predicted. It is also assumed that the scheduled traveling route is changed (updated) while the vehicle is traveling. In such a case, each time the scheduled traveling route is updated, vehicle information including the scheduled traveling route after the update may be transmitted from the terminal 10 to the server 20.

When the shop information transmitted from the server 20 in response to the above-described vehicle information is received by the communication I/F 130 of the terminal 10, the control unit 110 of the terminal 10 sorts the shops to be presented to the user based on the shop information. First, the control unit 110 identifies the second store from the stores included in the store information (hereinafter, sometimes referred to as "first stores"). The second store is a store located closer to the traveling direction than the current position of the vehicle and located along the lane in the traveling direction of the vehicle among the first stores. The identification of the second store may be performed, for example, based on the position information included in the store information, the current position of the vehicle, and the scheduled travel route of the vehicle. As a result, in the first store, a store located on the reverse direction (the direction in which the vehicle retreats) side of the current position of the vehicle and a store located along the lane (the opposite lane) in the direction opposite to the traveling direction of the vehicle are excluded.

When the second store is selected from among the first stores as described above, the control unit 110 identifies the third store from among the second stores. The third store is a store provided with a vehicle facility. In an example, identification of the third store may be performed based on the vehicle facility information included in the store information corresponding to the second store. As a result, a store that does not include the vehicle facility is excluded from the second store.

When the third store is selected from the second store as described above, the control unit 110 identifies the fourth store from the third store area. The fourth store is a store that does not fall under a predetermined exclusion target. The predetermined exclusion target in the present embodiment is a store presented to the user in a predetermined period in the past, a store similar to the store, and a store in which an event different from the predetermined period is not held. Therefore, the control unit 110 identifies the third store corresponding to the predetermined exclusion target by collating the store information corresponding to the third store with the history data D121 of the storage unit 120. Specifically, the control unit 110 first identifies a store (hereinafter, also referred to as a "presented store") whose presentation date and time belongs to a predetermined time interval among the stores included in the history data D121. Subsequently, the control unit 110 extracts, from among the third stores, a third store whose store ID matches the presented store and a third store whose attribution data matches the presented store. Then, the control unit 110 identifies, as a predetermined exclusion target, a third store in the extracted third store in which an event different from the predetermined period is not currently held. When the predetermined exclusion target is identified in this manner, the control unit 110 identifies, as the fourth store, the third store excluding the predetermined exclusion target among the third stores.

In the present embodiment, the first store, the second store, the third store, and the fourth store correspond to the "first facility", the "second facility", the "third facility", and the "fourth facility" according to the present disclosure, respectively.

When the fourth store is identified from the third store as described above, the control unit 110 sets the identified fourth store as a candidate of a store to be presented to the user (hereinafter, may be referred to as "presentation candidate"). In a case where there is no store corresponding to the fourth store in the first store included in the store information, the control unit 110 may determine a presentation candidate from among the first stores (hereinafter, also referred to as "neighboring stores") located along the neighboring road of the scheduled traveling route among the first stores included in the store information. The surrounding road may, in one example, be a road located within a predetermined distance (e.g., on the order of hundreds of meters to several kilometers) from each point of the scheduled travel route. At this time, the control unit 110 may determine, as a presentation candidate, a store that is a store provided with a vehicle facility and that does not fall under a predetermined exclusion target among the neighboring stores.

When the vehicle stops with the red signal after the candidate for posting is set, the control unit 110 acquires the remaining time length of the red signal. For example, the control unit 110 may acquire the remaining time length of the red signal by communicating with the roadside device attached to the traffic light through the communication I/F 130. As another example, vehicles may be equipped with receivers for VICS. In this case, the control unit 110 may receive the signal information (including the remaining time length of the red signal) transmitted from the transmitter for VICS (registered trademark) provided in conjunction with the traffic light, through the in-vehicle receiver. Thus, the control unit 110 may acquire the remaining time length of the red signal. Whether or not the vehicle is stopped by the red signal may be determined based on the information transmitted from the roadside device or the transmitter described above, or may be determined based on an image captured by an in-vehicle camera.

In response to acquiring the remaining time length of the red signal, the control unit 110 determines whether the remaining time length is equal to or longer than the first time length. The first time length may be, in one example, a time length of greater than or equal to 15 seconds and less than 30 seconds. In the present embodiment, the first time length corresponds to the "predetermined time length" according to the present disclosure. When it is determined that the remaining time length of the red signal is equal to or longer than the first time length, the control unit 110 identifies a fourth store located at a position closest to the current position of the vehicle among the fourth stores set as the presentation candidates. The identification is performed by collating the current position of the vehicle detected by the position sensor 150 with the position information of the fourth store set as the presentation candidate. At this time, among the fourth shops set as the presentation candidates, the fourth shop located on the reverse direction side of the current position of the vehicle may be excluded from the specific target. Then, the control unit 110 outputs the proposal screen corresponding to the specified fourth store through the input/output device 140. In addition to the information on the fourth store (hereinafter, sometimes referred to as "proposal store information"), the proposal screen in the present embodiment includes a GUI component (for example, a button for selecting whether to stop at the fourth store) for allowing a user of the vehicle to select whether to stop at the fourth store. When such a selection screen is output, the control unit 110 may output a voice message corresponding to the proposal shop information through the input/output device 140.

Note that the information amount of the proposal store information included in the proposal screen may be changed according to the remaining time length of the red signal. As an example, the remaining time length of the red signal may be greater than or equal to the first time length and less than the second time length. In this case, when the proposal store information includes only the simple information about the fourth store and the remaining time length of the red signal is equal to or longer than the second time length, the proposal store information may include the detailed information of the fourth store. The second time length may be a longer time length than the first time length, and in one example, may be a time length of 30 seconds or more and less than 60 seconds. In an example, the simple information may be information including a store name of the fourth store and an outline (for example, only a product name, a photograph, and a price) of a product sold at the fourth store. Further, in an example, the detailed information may be information including a store name of the fourth store and details of a commodity sold at the fourth store (for example, a commodity name, a photograph, a price, and the like in addition to the description of the commodity). When an event is held at the fourth store, information about the event may be included in the proposal store information.

In response to the proposal screen as described above being output to the input/output device 140, when the user of the vehicle inputs an operation of selecting to stop at the fourth shop to the input/output device 140, the control unit 110 determines whether the fourth shop is a shop that can make a telephone reservation. This determination is performed based on the telephone reservation information included in the store information corresponding to the fourth store. In a case where it is determined that the fourth store is a store capable of telephone reservation, the control unit 110 first calculates an expected arrival time at the fourth store. This calculation may be performed by a known method using the distance from the current position of the vehicle to the fourth store, traffic jam information, and the like. Next, the control unit 110 causes the input/output device 140 to output a selection screen including the calculated estimated arrival time. The selection screen is a screen prompting the fourth store to select whether to make a telephone reservation. Such a selection window may include, in one instance, a GUI component (e.g., a button for selecting whether or not to make a telephone appointment) to allow a user of the vehicle to select whether or not to make a telephone appointment in addition to the scheduled arrival time. In addition to the selection screen described above, the control unit 110 may output a voice message notifying the scheduled arrival time and a voice message prompting selection of whether to make a telephone reservation through the input/output device 140.

In response to the selection screen as described above being output to the input/output device 140, an operation of selecting that the user of the vehicle makes a telephone reservation is input to the input/output device 140. As a result, the control unit 110 connects to the user terminal 30 through the communication I/F 130, and makes a call to the fourth store through the user terminal 30 (makes a call). Note that the control unit 110 may make a call by a method of attempting to establish a communication connection using a hands-free profile through a head unit or the like.

Further, in response to the proposal screen as described above being output to the input/output device 140, an operation of selecting that the user of the vehicle stops at the fourth store is input to the input/output device 140. As a result, the control unit 110 sets the fourth store as a route location, and starts route guidance to the fourth store. When the vehicle is traveling without the destination being input to the car navigation system, the control unit 110 may set the fourth store as the destination and start route guidance to the fourth store.

Processing Flow

Figure 4:
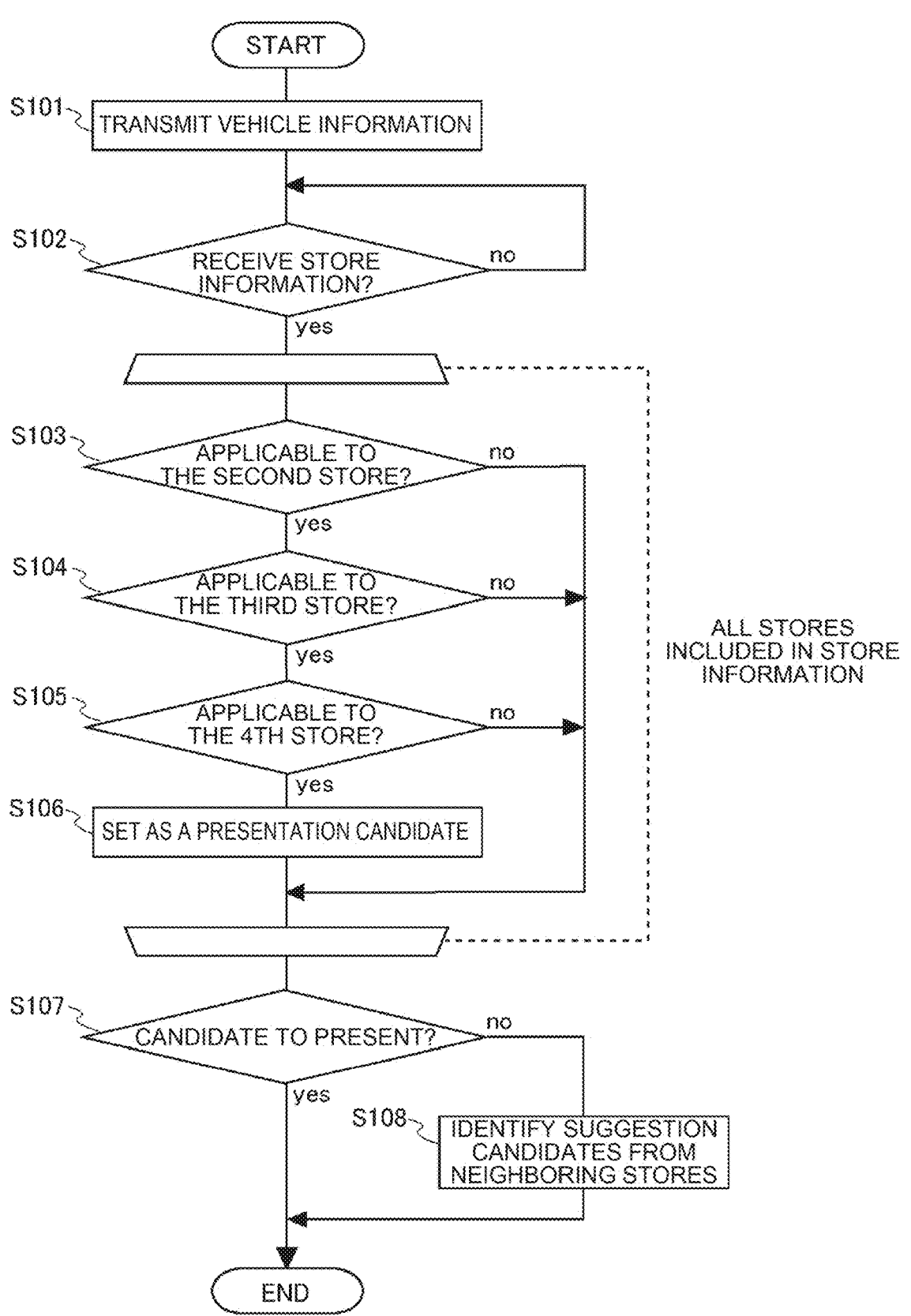
FIG. 4 is a flow chart illustrating an exemplary first process routine executed by the terminal according to the embodiment.
Figure 5:
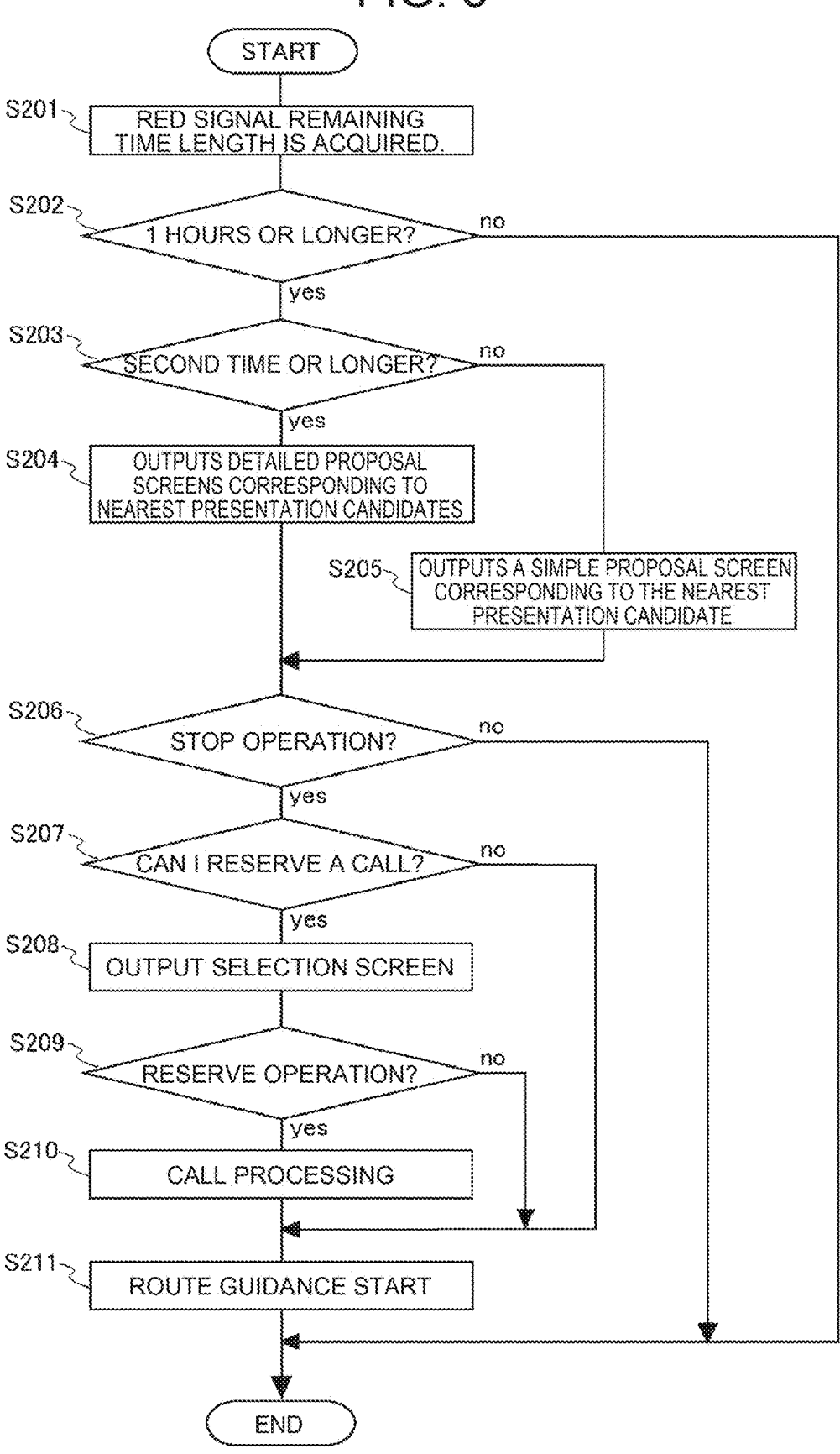
FIG. 5 is a flowchart illustrating an example of a second processing routine executed by a terminal according to the embodiment.

Here, a flow of processing executed by the terminal 10 according to the present embodiment will be described with reference to FIG. 4 and FIG. 5. FIG. 4 is a flowchart illustrating an example of a first processing routine executed by the terminal 10 on the basis of the fact that the scheduled traveling route of the vehicle is set. FIG. 5 is a flowchart illustrating an example of a second processing routine executed by the terminal 10 triggered by the vehicle stopping with a red signal.

First, in the first process routine of FIG. 4, the control unit 110 of the terminal 10 transmits vehicle information including the set scheduled traveling route to the servers 20 through the communication I/F 130, triggered by the fact that the scheduled traveling route of the vehicle has been set (S101). Upon completion of S101 process, the control unit 110 executes S102 process.

In S102, the control unit 110 receives the store information transmitted from the servers 20 in response to the vehicle information via the communication I/F 130. Upon completion of S102 process, the control unit 110 executes S103 to S106 process. S103 to S106 process is executed for each of the first stores included in the store data.

In S103, the control unit 110 determines whether the target first store corresponds to the second store. The second store is a store located closer to the traveling direction than the current position of the vehicle, and is located along the lane in the traveling direction of the vehicle. The determination as to whether or not the target first store corresponds to the second store is performed based on the position information included in the store information corresponding to the target first store, the current position of the vehicle, and the travel scheduled route of the vehicle, as described above. When it is determined that the target first store does not correspond to the second store (negative determination in S103), the control unit 110 skips S104 to S106 process. Then, the control unit 110 executes S103 process for another first store (a first store not yet targeted) included in the store data. When it is determined that the target first store corresponds to the second store (affirmative determination in S103), the control unit 110 executes S104 process.

In S104, the control unit 110 determines whether the target first store corresponds to the third store. The third store is a store provided with a vehicle facility. The determination as to whether or not the target first store corresponds to the third store is performed based on the vehicle facility information included in the store information corresponding to the target first store, as described above. When it is determined that the target first store does not correspond to the third store (negative determination in S104), the control unit 110 skips S105 to S106 process. Then, the control unit 110 executes S103 process for another first store (a first store not yet targeted) included in the store data. When it is determined that the target first store corresponds to the third store (affirmative determination in S104), the control unit 110 executes S105 process.

In S105, the control unit 110 determines whether the target first store corresponds to the fourth store. The fourth store is a store that does not correspond to a predetermined exclusion target (a store presented to the user in a predetermined period in the past and a store similar to the store and in which an event different from the predetermined period is not held). The determination as to whether or not the target first store corresponds to the fourth store is performed by collating the store information corresponding to the target first store with the history data D121 of the storage unit 120, as described above. When it is determined that the target first store does not correspond to the fourth store (negative determination in S105), the control unit 110 skips the process of S106, and executes the process of S103 for another first store (a first store that is not yet a target) included in the store data. When it is determined that the target first store corresponds to the fourth store (affirmative determination in S105), the control unit 110 executes S106 process.

In S106, the control unit 110 sets the target first store (corresponding to the fourth store) as the presentation candidates. After executing S106 process, the control unit 110 executes S103 process for another first store (a first store not yet targeted) included in the store data. When S103 to S106 process has been executed for all the first stores included in the store data, the control unit 110 executes S107 process.

In S107, the control unit 110 determines whether or not there is a first store (a first store corresponding to all of the second store, the third store, and the fourth store) that is set as a presentation candidate among the first stores included in the store information. When there is a first store set as a presentation candidate in the first store included in the store information (affirmative determination in S107), the control unit 110 ends the execution of the first processing routine. In addition, when there is no first store set as the presentation candidates in the first store included in the store data (negative determination in S107), the control unit 110 executes S108 process.

In S108, the control unit 110 determines presentation candidates from among the first stores included in the store data and corresponding to the neighboring stores. As described above, the neighboring store is the first store located along the neighboring road of the scheduled traveling route among the first stores included in the store information. In other words, the neighboring store is the first store that does not correspond to the second store among the first stores included in the store information. When S108 processing is finished, the control unit 110 ends the execution of the first processing routine.

Next, the second processing routine of FIG. 5 will be described. Here, description will be given on the assumption that the first processing routine illustrated in FIG. 4 has been executed (presentation candidates have been set).

In the second process of FIG. 5, the control unit 110 of the terminal 10 acquires the remaining time length of the red signal by triggering that the vehicle is stopped by the red signal (S201). In one embodiment, the control unit 110 may acquire the remaining time length of the red signal by communicating with the roadside device provided in the traffic light through the communication I/F 130. In another embodiment, the control unit 110 may acquire the remaining time length of the red signal by receiving the signal transmitted from VICS (registered trademark) transmitter coupled to the traffic light through the in-vehicle VICS (registered trademark) receiver. Upon completion of S201 process, the control unit 110 executes S202 process.

In S202, the control unit 110 determines whether or not the remaining time length of the red signal acquired by S201 is equal to or greater than the first time length (for example, a time length of 15 seconds or more and less than 30 seconds). When the remaining time length of the red signal is less than the first time length (negative determination in S202), the control unit 110 ends the execution of the second processing routine. On the other hand, when the remaining time length of the red signal is equal to or longer than the first time length (an affirmative determination is made on S203), the control unit 110 executes S203 process.

In S203, the control unit 110 determines whether or not the remaining time length of the red signal acquired by S201 is equal to or greater than the second time length (a time length longer than the first time length, for example, a time length of 30 seconds or more and less than 60 seconds). When the remaining time length of the red signal is equal to or longer than the second time length (affirmative determination in S203), the control unit 110 executes S204 process. On the other hand, when the remaining time length of the red signal is less than the second time length (negative determination in S203), the control unit 110 executes S205 process.

In S204, the control unit 110 outputs, through the input/output device 140, a detailed proposal window corresponding to a nearest presentation candidate (a presentation candidate located at a position closest to the present position of the vehicle) among the presentation candidates set through the execution of the first process routine of FIG. 4. Specifically, the control unit 110 first acquires the current position of the vehicle through the position sensor 150. The control unit 110 identifies the nearest presentation candidate by collating the acquired current position of the vehicle with the position information included in the respective shop information of the presentation candidate. In this case, among the presentation candidates, the presentation candidates located on the backward direction side of the current position of the vehicle may be excluded from the specific target. The control unit 110 generates a detailed proposal screen corresponding to the presentation candidate based on the shop information of the identified presentation candidate. As described above, the detailed proposal screen may include a GUI part for allowing a user of the vehicle to select whether to stop at the presentation candidate, and detailed proposal store information (including a store name and details of the product (including, for example, a product name, a photograph, a price, an explanation of the product, and the like)). Then, the control unit 110 outputs the generated proposal screen through the input/output device 140.

In S205, the control unit 110 outputs a simple proposal window corresponding to the nearest presentation candidates through the input/output device 140. Specifically, the control unit 110 first identifies presentation candidates located at positions closest to the present position of the vehicles in the same manner as in S204. Subsequently, the control unit 110 generates a simple proposal screen corresponding to the presentation candidate on the basis of the shop information of the identified presentation candidate. As described above, the simple proposal screen may include a GUI component for allowing a user of the vehicle to select whether to stop at the presentation candidate, and simple proposal store information (including only the store name and the outline of the product (including, for example, only the product name, the photograph, and the price)). Then, the control unit 110 outputs the generated proposal screen through the input/output device 140.

Upon completion of S204 or S205 process, the control unit 110 executes S206 process. In S206, the control unit 110 determines whether or not the input/output device 140 has been operated to select to stop at the nearest suggestion candidates. When the input/output device 140 receives an instruction to select not to stop at the nearest suggestion candidate (negative determination in S206), the control unit 110 ends the execution of the second processing routine. On the other hand, when the input/output device 140 receives an operation of selecting to stop at the nearest suggestion candidate (affirmative determination in S206), the control unit 110 executes S207 process.

In S207, the control unit 110 determines whether or not the nearest presentation candidates are stores that can be reserved by telephone. As described above, the determination of whether the nearest presentation candidate is a telephone reservation possible store is performed based on the telephone reservation information included in the shop information of the presentation candidate. When the nearest presentation candidates are shops that can reserve a telephone call (affirmative determination is made in S207), the control unit 110 executes S208 process. On the other hand, when the nearest presentation candidates are non-telephone-reservable stores (negative determination in S207), the control unit 110 skips S208 to S210 process and executes S211 process.

In S208, the control unit 110 causes the input/output device 140 to output a selection window. The selection screen is a screen prompting the nearest presentation candidate to select whether to make a telephone reservation. Such a selection window may include, as described above, a scheduled arrival time of the presentation candidates and a GUI component for causing a user of the vehicle to select whether to make a telephone reservation or not. The estimated arrival time may be calculated by a known method using a distance from the current position of the vehicle to the nearest presentation candidate, traffic jam information, and the like. Upon completion of S208 process, the control unit 110 executes S209 process.

In S209, the control unit 110 determines whether the input/output device 140 has been operated to select a telephone appointment for the nearest presentation candidates. When the input/output device 140 receives an instruction to select a telephone appointment as the nearest presentation candidate (affirmative determination in S209), the control unit 110 executes S210 process. On the other hand, when the input/output device 140 receives an operation of selecting not to reserve a telephone call as the nearest presentation candidate (negative determination in S209), the control unit 110 skips S210 and executes S211 process.

In S210, the control unit 110 connects to the user terminal 30 through the communication I/F 130, and makes a call to the nearest presentation candidates through the user terminal 30 (makes a call). Upon completion of S210 process, the control unit 110 executes S211 process.

In S211, the control unit 110 sets the nearest presentation candidate as a waypoint and passes the route guidance to the presentation candidate. When S211 process is completed, the control unit 110 terminates the second process routine.

Operation and Effect of Embodiments

In the embodiment described above, the information is presented to the user only for the first store (presentation candidate) that satisfies all of the conditions of the second store, the conditions of the third store, and the conditions of the fourth store among the one or more first stores located in the vicinity of the scheduled travel route of the vehicle. As a result, the proposal store information is not presented to the user for the specific first store among the one or more first stores located in the vicinity of the scheduled traveling route. The specific first store includes a first store located on a reverse direction side of a current position of the vehicle. The specific first store includes a first store located along a lane (opposite lane) in a direction opposite to a traveling direction of the vehicle. A particular first store includes a first store that is not equipped with vehicle equipment. The specific first store includes a first store (and a first store similar to the first store) presented to the user in a predetermined period of time in the past, and in which an event different from the predetermined period of time is not held. As a result, it is possible to suppress the user of the vehicle from feeling troublesomeness.

In addition, in the above-described embodiment, only when the stop time length of the vehicle (the remaining time length of the red signal) due to the red signal is sufficiently long, the proposal store information is presented to the user of the vehicle. Further, in the above-described embodiment, the information amount of the proposal store information is changed in accordance with the stop time length of the vehicle due to the red signal. This makes it possible to allow the user of the vehicle to recognize the proposed shop information while ensuring safety.

Further, in the above-described embodiment, in a case where the first store that is the target of the proposal store information is a store that can make a telephone reservation, a screen (selection screen) for allowing the user of the vehicle to select the necessity of the telephone reservation is presented. Then, when the user selects to make a telephone reservation at the first store, call processing for the first store is automatically performed. Accordingly, the user of the vehicle can make a reservation for the first store without performing a complicated operation.

Therefore, according to the present embodiment, it is possible to improve the convenience of the user when presenting the information of the restaurant located in the vicinity of the travel route of the vehicle.

Other

The above-described embodiment is merely an example, and the present disclosure can be appropriately modified and implemented without departing from the gist thereof. For example, among the functions of the terminal 10, the function of changing the information amount of the proposal store information according to the remaining time length of the red signal may be omitted. Among the functions of the terminal 10, a function of allowing the user of the vehicle to select whether to stop at the presentation candidate may be omitted. Among the functions of the terminal 10, a function of making a call for reservation to a presentation candidate may be omitted. Further, the store information may be generated by the terminal 10 instead of the server 20. Further, the setting of the presentation candidates (for example, the processing of S103 to S108 in the first processing routine illustrated in FIG. 4) may be executed by triggering that the vehicle is stopped by the red signal.

The present disclosure can also be realized by supplying a computer program (information processing program) that implements the functions described in the above embodiments to a computer, and one or more processors included in the computer read and execute the program. Such a computer program may be provided to the computer by a non-transitory computer-readable storage medium connectable to the system bus of the computer, or may be provided to the computer via a network. The non-transitory computer readable storage medium is a recording medium which can store information, such as data and programs, by an electric, magnetic, optical, mechanical, or chemical action and which can read the information from a computer or the like. Examples of such a recording medium include any types of disks such as magnetic disks (floppy (registered trademark) disks, HDD, or the like) and optical disks (CD-ROM, DVD disks, Blu-ray disks, or the like). The recording medium may be a medium such as a ROM, RAM, EPROM, EEPROM, a magnetic card, a flash memory, an optical card, or a solid state drive (SSD).

What is claimed is:

1. An information processing device comprising a control unit configured to execute
    acquiring first information about one or more first facilities located around a scheduled travel route of a vehicle,
    specifying, according to the first information, second facilities that are facilities located on a traveling direction side of the vehicle along the scheduled travel route, from among the first facilities,
    specifying, according to information corresponding to the second facilities included in the first information, third facilities that are facilities provided with a vehicle facility having a drive-through, from among the second facilities,
    specifying, according to information corresponding to the third facilities included in the first information, fourth facilities that are facilities not presented to a user in a predetermined period in the past, from among the third facilities,
    detecting that the vehicle is stopped by a red signal,
    acquiring a remaining time length of the red signal,
    determining whether the remaining time length is equal to or longer than a first predetermined time length,
    outputting second information corresponding to one of the fourth facilities located at a position closest to a current position of the vehicle in a state where the remaining time length is equal to or longer than the first predetermined time length,
    changing an amount of the second information to be output according to the remaining time length, and
    receiving, after outputting the second information, an operation of making a telephone reservation of the one of the fourth facilities and making a call to the one of the fourth facility in response to receiving the operation.

2. The information processing device according to claim 1, wherein the first predetermined time length is from 15 to 30 seconds.

3. The information processing device according to claim 1, wherein the control unit is further configured to execute outputting the second information with a name, a photograph, and a price of a product sold at the one of the fourth facilities in a state where the remaining time length is equal to or longer than the first predetermined time length and shorter than a second predetermined time length, and
    the second predetermined time length is longer than the first predetermined time length.

4. The information processing device according to claim 2, wherein the control unit is further configured to execute outputting the second information with a name, a photograph, and a price of a product sold at the one of the fourth facilities in a state where the remaining time length is equal to or longer than the first predetermined time length and shorter than a second predetermined time length, and
    the second predetermined time length is longer than the first predetermined time length.

5. The information processing device according to claim 1, wherein the control unit is further configured to execute outputting the second information with a name, a photograph, a price, and a description of a product sold at the one of the fourth facilities in a state where the remaining time length is equal to or longer a second predetermined time length, and
    the second predetermined time length is longer than the first predetermined time length.

6. The information processing device according to claim 2, wherein the control unit is further configured to execute outputting the second information with a name, a photograph, a price, and a description of a product sold at the one of the fourth facilities in a state where the remaining time length is equal to or longer a second predetermined time length, and the second predetermined time length is longer than the first predetermined time length.

7. The information processing device according to claim 3, wherein the second predetermined time length is from 30 to 60 seconds.

8. The information processing device according to claim 4, wherein the second predetermined time length is from 30 to 60 seconds.

9. The information processing device according to claim 5, wherein the second predetermined time length is from 30 to 60 seconds.

10. The information processing device according to claim 6, wherein the second predetermined time length is from 30 to 60 seconds.

11. The information processing device according to claim 2, in a case where there is no fourth facility associated with the first facilities, the control unit is further configured to execute determining a presentation candidate for the second information from among the first facilities located along a road within a predetermined distance from the scheduled traveling route.

* * * * *